(12) United States Patent
Zhang

(10) Patent No.: US 12,333,956 B2
(45) Date of Patent: Jun. 17, 2025

(54) VEHICLE FLIGHT CONTROL METHOD AND APPARATUS FOR UNMANNED AERIAL VEHICLE, AND UNMANNED AERIAL VEHICLE

(71) Applicant: AUTEL ROBOTICS CO., LTD., Guangdong (CN)

(72) Inventor: Tianbao Zhang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 220 days.

(21) Appl. No.: 18/058,473

(22) Filed: Nov. 23, 2022

(65) Prior Publication Data
US 2023/0095700 A1 Mar. 30, 2023

Related U.S. Application Data

(63) Continuation of application No. PCT/CN2021/094636, filed on May 19, 2021.

(30) Foreign Application Priority Data

May 25, 2020 (CN) .......................... 202010447991.3

(51) Int. Cl.
*G08G 5/80* (2025.01)
*B64C 39/02* (2023.01)
*G08G 5/55* (2025.01)
*G08G 5/57* (2025.01)

(52) U.S. Cl.
CPC ............. *G08G 5/80* (2025.01); *B64C 39/024* (2013.01); *G08G 5/55* (2025.01); *G08G 5/57* (2025.01); *B64U 2201/10* (2023.01)

(58) Field of Classification Search
CPC .... G08G 5/045; G08G 5/0069; G08G 5/0052; G08G 5/0021; B64C 39/024; B64U 2201/10; G05D 1/101
See application file for complete search history.

(56) References Cited

U.S. PATENT DOCUMENTS

2016/0240091 A1* 8/2016 Thiele ...................... G08G 5/26
2017/0330467 A1* 11/2017 Umetani ................. G01S 19/15
(Continued)

FOREIGN PATENT DOCUMENTS

| CN | 104317291 A | | 1/2015 |
|---|---|---|---|
| CN | 107992086 A | * | 5/2018 |
| CN | 108827312 A | | 11/2018 |
| CN | 109343528 A | | 2/2019 |

(Continued)

OTHER PUBLICATIONS

Machine translation CN107992086 A, Gangchi, May 4, 2018.*

(Continued)

*Primary Examiner* — Abdalla A Khaled

(57) ABSTRACT

Embodiment of the present invention are a flight control method and apparatus for an unmanned aerial vehicle, and an unmanned aerial vehicle. The flight control method for an unmanned aerial vehicle includes: obtaining an obstacle position and an obstacle orientation of each obstacle within a preset range around the unmanned aerial vehicle; calculating a push-pull coefficient of each obstacle relative to the unmanned aerial vehicle according to the obstacle position of each obstacle; obtaining a target position and a target orientation of the unmanned aerial vehicle; calculating a baton coefficient of the target position relative to the unmanned aerial vehicle according to the target position; and adjusting a flight direction of the unmanned aerial vehicle according to the baton coefficient, the target orientation, the push-pull coefficient of each obstacle relative to the unmanned aerial vehicle, and the obstacle orientation.

17 Claims, 7 Drawing Sheets

(56) References Cited

U.S. PATENT DOCUMENTS

| | | | | |
|---|---|---|---|---|
| 2017/0358228 A1* | 12/2017 | Priest | ............... | G06V 20/17 |
| 2018/0102057 A1* | 4/2018 | Lo | ............... | G05D 1/101 |
| 2019/0138029 A1* | 5/2019 | Ryll | ............... | G06T 7/73 |
| 2019/0139421 A1* | 5/2019 | Nilsson | ............... | G08G 5/22 |
| 2020/0265731 A1* | 8/2020 | Lev | ............... | G08G 5/32 |
| 2020/0409395 A1* | 12/2020 | Hilliges | ............... | B64U 10/14 |
| 2021/0197966 A1* | 7/2021 | Zhang | ............... | G08G 5/26 |
| 2022/0348325 A1* | 11/2022 | Peng | ............... | G08G 5/0069 |
| 2022/0375354 A1* | 11/2022 | Kang | ............... | H04W 84/20 |

FOREIGN PATENT DOCUMENTS

| | | |
|---|---|---|
| CN | 111443733 A | 7/2020 |
| JP | H07129238 A | 5/1995 |

OTHER PUBLICATIONS

Drones, UAV path planning Based on Multi-Stage constraint optimization, Yong Shen, 2015.*

PCT International Search Report; mailed Aug. 3, 2021; PCT/CN2021/094636.

"Robot path planning of artificial potential field method based on hierarchical fuzzy system" written by Wu-xi Shi etc., published on the Journal of Tianjin Polytechnic University in Dec. 2014.

"Research on trajectory planning and virtual monitoring technology of six axis industry robot" written by Xiaobo Wang in May 2018; 77 pages.

* cited by examiner

VEHICLE FLIGHT CONTROL METHOD AND APPARATUS FOR UNMANNED AERIAL VEHICLE, AND UNMANNED AERIAL VEHICLE

CROSS-REFERENCE TO RELATED APPLICATIONS

The present application is a continuation of International Application No. PCT/CN2021/094636, filed on May 19, 2021, which claims priority to Chinese Patent Application No. 2020104479913, filed on May 25, 2020, which is incorporated herein by reference in its entirety.

TECHNICAL FIELD

The present invention relates to the field of unmanned aerial vehicle technologies, and in particular, to a vehicle flight control method and apparatus for an unmanned aerial vehicle, and an unmanned aerial vehicle.

BACKGROUND

An unmanned aerial vehicle is an unmanned aircraft operated by a radio remote control device or a self-contained program control apparatus. With the development of technologies related to the unmanned aerial vehicle and complex changes of an application scenario of the unmanned aerial vehicle, to ensure that the unmanned aerial vehicle safely flight without collision in a complex application scenario, higher requirements are imposed for an intelligent control system of the unmanned aerial vehicle, and how to perform flight control such as obstacle avoidance, tracking, and obstacle bypassing more intelligently has become a technical difficulty of current consumption of the unmanned aerial vehicle.

Currently, for complex changes of a plurality of scenarios in a flight environment of the unmanned aerial vehicle, a path planning algorithm planned according to a time period is mainly adopted, for example, a trajectory within a preset time period is planned and transmitted, and the unmanned aerial vehicle follows the trajectory, thereby effectively avoiding a static obstacle. However, such an algorithm cannot continuously change a flight trajectory of the unmanned aerial vehicle in real time. In view of this, the algorithm is not applicable to a scenario of a dynamic obstacle.

SUMMARY

To resolve the foregoing technical problems, embodiments of the present invention provide a flight control method and apparatus for an unmanned aerial vehicle, and an unmanned aerial vehicle, to resolve the technical problems that a dynamic obstacle cannot be effectively avoided by using a path planning algorithm, and safe flight cannot be fundamentally achieved.

To resolve the foregoing technical problem, the embodiments of the present invention provide the following technical solutions:

According to a first aspect, an embodiment of the present invention provides a flight control method for an unmanned aerial vehicle, including: obtaining an obstacle position and an obstacle orientation of each obstacle within a preset range around the unmanned aerial vehicle; calculating a push-pull coefficient of each obstacle relative to the unmanned aerial vehicle according to the obstacle position of each obstacle; obtaining a target position and a target orientation of the unmanned aerial vehicle; calculating a baton coefficient of the target position relative to the unmanned aerial vehicle according to the target position; and adjusting a flight direction of the unmanned aerial vehicle according to the baton coefficient, the target orientation, the push-pull coefficient of each obstacle relative to the unmanned aerial vehicle, and the obstacle orientation.

Optionally, the step of adjusting a flight direction of the unmanned aerial vehicle according to the baton coefficient, the target orientation, the push-pull coefficient of each obstacle relative to the unmanned aerial vehicle, and the obstacle orientation further includes: calculating push-pull coefficient components of the push-pull coefficient of each obstacle in six axes with reference to the obstacle orientation of each obstacle; calculating baton coefficient components of the baton coefficient in the six axes with reference to the target orientation; determining, according to the push-pull coefficient components of each obstacle and the baton coefficient components, an axial direction in which the unmanned aerial vehicle can fly in the six axes; and adjusting a velocity component of the unmanned aerial vehicle in the axial direction in which the unmanned aerial vehicle can fly, to adjust the flight direction of the unmanned aerial vehicle.

Optionally, the step of determining, according to the push-pull coefficient components of each obstacle and the baton coefficient components, an axial direction in which the unmanned aerial vehicle can fly in the six axes further includes: determining whether a baton coefficient component in each axial direction meets a first preset condition, or determining whether a push-pull coefficient component of each obstacle in each axial direction meets a second preset condition; determining, when the baton coefficient component in the axial direction meets the first preset condition, that the axial direction corresponding to the baton coefficient component that meets the first preset condition as an axial direction in which the unmanned aerial vehicle cannot fly; and determining, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

Optionally, the step of determining, according to the push-pull coefficient components of each obstacle and the baton coefficient components, an axial direction in which the unmanned aerial vehicle can fly in the six axes further includes: determining, according to the push-pull coefficient components of each obstacle and the baton coefficient components, whether there is an obstacle in each of the remaining axial directions that blocks the unmanned aerial vehicle from flying in the axial directions; determining, when there is a blocking obstacle in the axial direction, that the axial direction is an axial direction in which the unmanned aerial vehicle cannot fly; and determining, when there is no blocking obstacle in the axial direction, that the axial direction is an axial direction in which the unmanned aerial vehicle can fly.

Optionally, the determining whether there is an obstacle in each of the remaining axial directions that blocks the unmanned aerial vehicle from flying in the axial direction further includes: respectively calculating products of the baton coefficient components corresponding to the axial directions and the push-pull coefficient component of each obstacles in the axial directions; determining whether there is a product that meets a third preset condition; determining that there is no blocking obstacle in the axial directions when there is no product that meets the third preset condition; and determining that there is no blocking obstacle in the axial directions when there is no product that meets the third preset condition.

Optionally, the six axes include: a positive X-axis, a negative X-axis, a positive Y-axis, a negative Y-axis, a positive Z-axis and a negative Z-axis.

Optionally, the step of adjusting a velocity component of the unmanned aerial vehicle in the axial direction in which the unmanned aerial vehicle can fly further includes: obtaining a maximum push-pull coefficient component in the axial directions in which the unmanned aerial vehicle can fly; and setting the velocity component of the unmanned aerial vehicle in the axial direction in which the unmanned aerial vehicle can fly to:

$$V_a^b = (1 - s_a^b \Box pp_a^b)V_p$$

$s_a^b$ is the baton coefficient component, $pp_a^b$ is a maximum push-pull coefficient component in the axial direction in which the unmanned aerial vehicle can fly, and $V_p$ is a preset velocity.

Optionally, in the step of calculating a push-pull coefficient of each obstacle relative to the unmanned aerial vehicle according to the obstacle position of each obstacle, the push-pull coefficient is calculated as follows:

$$pp = \frac{d_{pp}}{\max(d, 0.01)}$$

$$d_{pp} = d_{safe} + V * t_{safe}$$

pp is a push-pull coefficient of each obstacle, $d_{pp}$ is a push-pull threshold, max (d, 0.01) represents a distance between the unmanned aerial vehicle and the obstacle, $d_{safe}$ is a minimum safe distance, $t_{safe}$ is a shortest reserved time, and V is a current flight velocity of the unmanned aerial vehicle.

Optionally, in the step of calculating a baton coefficient of the target position relative to the unmanned aerial vehicle according to the target position, the baton coefficient is calculated as follows:

$$s = \frac{d_{pp}}{\max(|\overrightarrow{OT}|, 0.01)}$$

$$d_{pp} = d_{safe} + V * t_{safe}$$

$$\overrightarrow{OT} = (q_y, q_z, |\overrightarrow{OT}|)$$

s is the baton coefficient, $d_{pp}$ is a push-pull threshold, max ($|\overrightarrow{OT}|$, 0.01) represents a distance between the unmanned aerial vehicle and the target position, an $\overrightarrow{OT}$ vector representing a vector between a point of the unmanned aerial vehicle and a point of the target position, $d_{safe}$ is a minimum safe distance, $t_{safe}$ is a shortest reserved time, V is a current flight velocity of the unmanned aerial vehicle, $q_y$ is a line-of-sight inclination between the unmanned aerial vehicle and the target position, and $q_z$ is a line-of-sight declination between the unmanned aerial vehicle and the target position.

Optionally, the step of obtaining an obstacle position and an obstacle orientation of each obstacle within a preset range around the unmanned aerial vehicle further includes: obtaining depth maps acquired by depth sensors arranged around a vehicle body of the unmanned aerial vehicle; and recognizing obstacles within the preset range around the unmanned aerial vehicle, and the obstacle position and the obstacle orientation of each obstacle according to the depth maps.

According to a second aspect, an embodiment of the present invention provides a flight control apparatus for an unmanned aerial vehicle, including: a first obtaining module, configured to obtain an obstacle position and an obstacle orientation of each obstacle within a preset range around the unmanned aerial vehicle; a first calculation module, configured to calculate a push-pull coefficient of each obstacle relative to the unmanned aerial vehicle according to the obstacle position of each obstacle; a second obtaining module, configured to obtain a target position and a target orientation of the unmanned aerial vehicle; a second calculation module, configured to calculate a baton coefficient of the target position relative to the unmanned aerial vehicle according to the target position; and an adjustment module, configured to adjust a flight direction of the unmanned aerial vehicle according to the baton coefficient, the target orientation, the push-pull coefficient of each obstacle relative to the unmanned aerial vehicle, and the obstacle orientation.

According to a third aspect, an embodiment of the present invention provides an unmanned aerial vehicle, including: at least one processor; and a memory communicatively connected to the at least one processor, where the memory stores instructions executable by the at least one processor, and the instructions are executed by the at least one processor to enable the at least one processor to perform the flight control method for an unmanned aerial vehicle.

According to a fourth aspect, an embodiment of the present invention provides a non-volatile computer-readable storage medium storing computer executable instructions, the computer executable instructions being used for causing an unmanned aerial vehicle to perform the flight control method for an unmanned aerial vehicle.

BRIEF DESCRIPTION OF THE DRAWINGS

One or more embodiments are exemplarily described with reference to the corresponding figures in the accompanying drawings, and the descriptions are not to be construed as limiting the embodiments. Components in the accompanying drawings that have same reference numerals are represented as similar components, and unless otherwise particularly stated, the figures in the accompanying drawings are not drawn to scale.

DETAILED DESCRIPTION

To make the objectives, technical solutions and advantages of the present invention clearer and more comprehensible, the following further describes the present invention with reference to the accompanying drawings and embodiments. It should be understood that the specific embodiments herein are merely provided for describing the present invention and not intended to limit the present invention.

Embodiments of the present invention provide a flight control method, apparatus, for an unmanned aerial vehicle that are applicable to the unmanned aerial vehicle. The unmanned aerial vehicle determines an obstacle position, an obstacle orientation, a target position and a target orientation in real time, and adjusts a flight direction of the unmanned aerial vehicle in real time according to such information, so that the unmanned aerial vehicle effectively avoids static or dynamic obstacles when flying towards a target, thereby ensuring flight safety of the unmanned aerial vehicle in a complex environment.

Figure 1A:
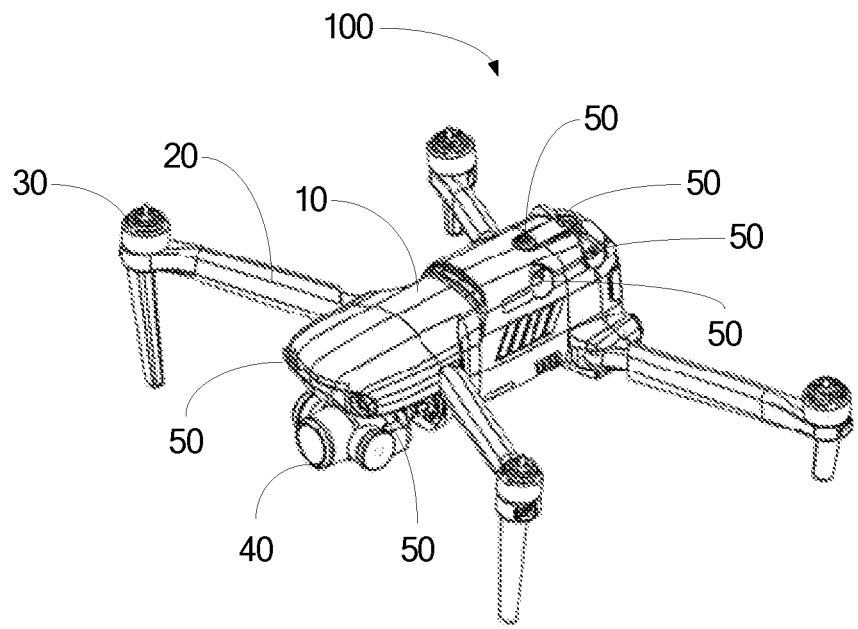
FIG. 1a is a schematic structural diagram of an unmanned aerial vehicle according to an embodiment of the present invention.
Figure 1B:
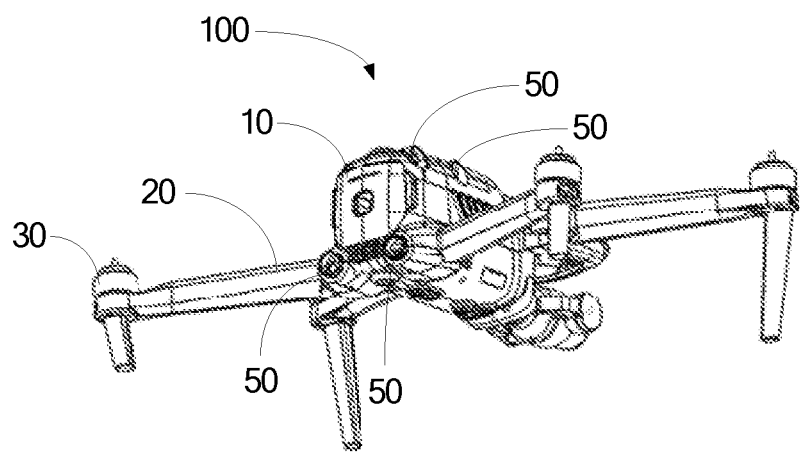
FIG. 1b is a schematic structural diagram of an unmanned aerial vehicle according to an embodiment of the present invention.

An embodiment of the present invention provides an unmanned aerial vehicle. As shown in FIG. 1a and FIG. 1b, the unmanned aerial vehicle 100 includes a vehicle body 10, arms 20, power apparatuses 30, a gimbal 40 and a plurality of depth sensors 50 arranged around the vehicle body 10.

The unmanned aerial vehicle 100 may be a high-altitude unmanned aerial vehicle or a low-altitude unmanned aerial vehicle of any suitable type, including a fixed-wing unmanned aerial vehicle, a rotary-wing unmanned aerial vehicle, a para-wing unmanned aerial vehicle, a flapping-wing unmanned aerial vehicle and the like. In some embodiments, the unmanned aerial vehicle 100 is a rotary-wing unmanned aerial vehicle. As shown in FIG. 1, the unmanned aerial vehicle 100 is a quadrotor unmanned aerial vehicle having 4 arms 20. Certainly, in some other embodiments, a quantity of arms 20 may be set according to actual requirements.

The power apparatus 30 is arranged on an end of the arm 20 far away from the vehicle body 10. The power apparatus 30 includes a motor (not shown) and a propeller (not shown). A rotation shaft of the motor is connected to the propeller, and the rotation shaft of the motor can rotate to drive rotation of the propeller, to provide lift or thrust for the unmanned aerial vehicle 100 to achieve flight. The motor may change the flight direction of the unmanned aerial vehicle 100 by changing a rotation speed and direction of the propeller, so that the unmanned aerial vehicle 100 may fly in any direction.

The gimbal 40 is mounted on the vehicle body 10. The gimbal 40 may be a horizontal rotating gimbal, an omnidirectional gimbal and the like. The horizontal rotating gimbal rotates left and right in a horizontal direction. The omnidirectional gimbal may rotate left and right in the horizontal direction, and may also rotate up and down in a vertical direction. The gimbal 40 aims at a target through rotation, to track the target.

The plurality of depth sensors 50 arranged around the vehicle body 10 are configured to acquire depth maps around the vehicle body 10 of the unmanned aerial vehicle. The depth map is an image or an image channel including information related to a distance to a surface of a scene object at a viewpoint. In the depth map, each pixel value represents an actual distance from the depth sensor to the object. Therefore, the depth sensor acquires the depth map means to acquire an actual distance between the depth sensor and an object in a front environment. The depth sensor 50 includes, but is not limited to, a binocular camera, a time of flight (TOF) camera and the like.

During autonomous flight, the unmanned aerial vehicle 100 may recognize and avoid static or dynamic obstacles around the unmanned aerial vehicle. The unmanned aerial vehicle 100 may recognize surrounding obstacles through depth maps in all directions acquired by the depth sensors 50 arranged around (including the front, the rear, the left, the right, the upper and the lower) the unmanned aerial vehicle. It may be understood that, the depth sensors 50 arranged around the vehicle body 10 of the unmanned aerial vehicle 100 may be arranged according to actual requirements. For example, there may be two or more depth sensors 50 in each direction. A specific quantity is not limited herein.

The unmanned aerial vehicle 100 may obtain an obstacle position and an obstacle orientation of each obstacle by processing the depth maps in all directions acquired by the depth sensors 50. The unmanned aerial vehicle may also process the depth maps in all directions to obtain a target position and a target orientation of the target.

Figure 2:
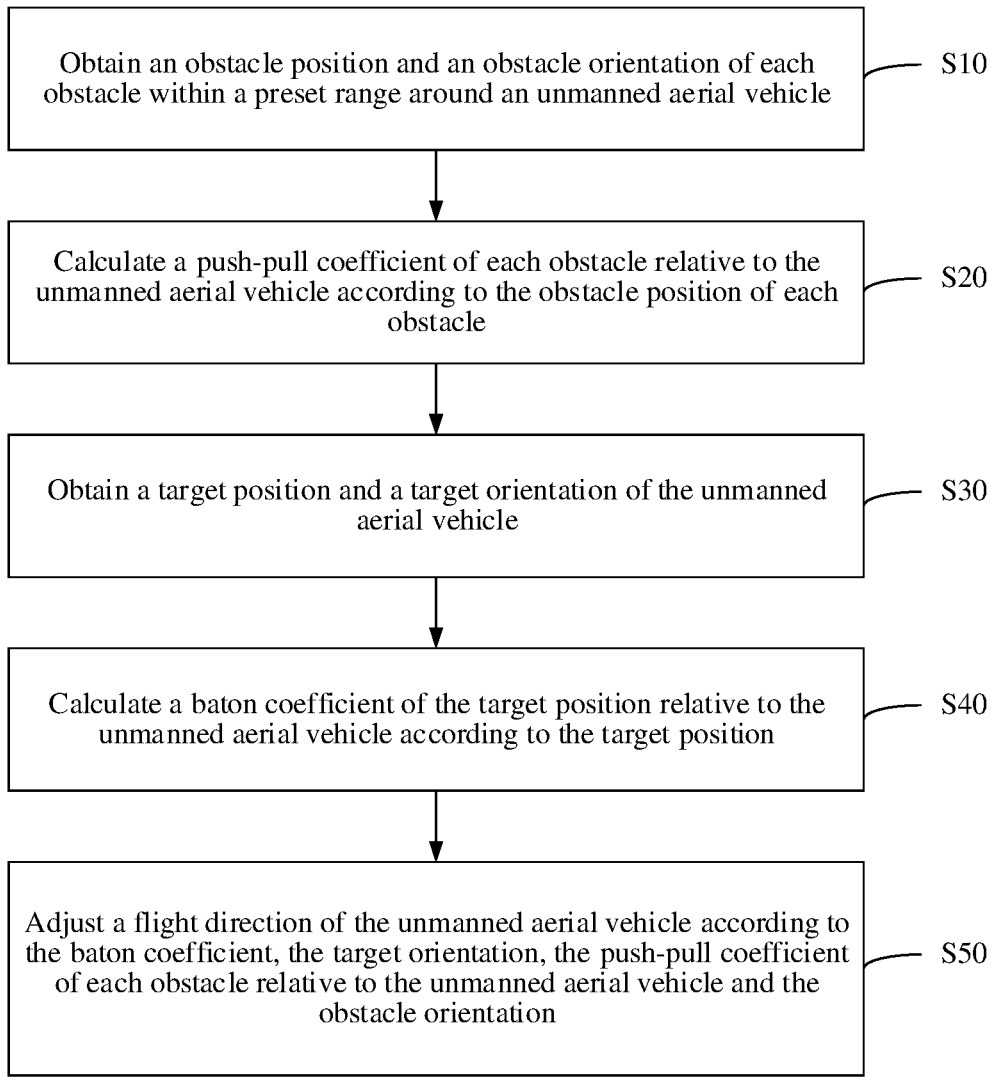
FIG. 2 is a schematic flowchart of a flight control method for an unmanned aerial vehicle according to an embodiment of the present invention.

Referring to FIG. 2, FIG. 2 is a schematic flowchart of a flight control method for an unmanned aerial vehicle according to an embodiment of the present invention. The flight control method for an unmanned aerial vehicle is applied to the unmanned aerial vehicle 100. The flight control method for an unmanned aerial vehicle includes:

S10: Obtain an obstacle position and an obstacle orientation of each obstacle within a preset range around the unmanned aerial vehicle.

The obstacle position is a position of each obstacle relative to the unmanned aerial vehicle. The obstacle orientation corresponds to an orientation of the unmanned aerial vehicle. In some embodiments, the obstacle orientation may be represented by using an elevation angle and a side slip angle of each obstacle relative to the unmanned aerial vehicle.

For the obstacle position and the obstacle orientation of each obstacle, surrounding images are acquired by the depth sensors arranged on the unmanned aerial vehicle, and then the obstacle position and the obstacle orientation of each obstacle are recognized according to the images. Certainly, after the obstacle position is obtained, an actual distance between obstacles may also be calculated according to the obstacle position and a current position of the unmanned aerial vehicle.

It is to be noted that, for obstacles around the unmanned aerial vehicle, some obstacles are relatively far away from the unmanned aerial vehicle, and some obstacles are relatively close to the unmanned aerial vehicle. The obstacles relatively far away from the unmanned aerial vehicle do not affect current flight of the unmanned aerial vehicle, which may be ignored. Therefore, during obtaining of the obstacles, the obstacles within a surrounding preset range may be obtained, where the surrounding preset range is a detection region for detecting the obstacles. In some embodiments, the detection region is a spherical region using the vehicle body of the unmanned aerial vehicle as a center of sphere. The spherical region is centered on the vehicle body of the unmanned aerial vehicle. The elevation angle is equally divided into preset parts, and the side slip angle is equally divided into preset parts. In this way, any position in the spherical region is represented by a set of an elevation angle and a side slip angle. For example, the elevation angle may be divided into 180 parts, and the side slip angle may be divided into 360 parts, to obtain 180*360=64800 angle combinations. When an obstacle falls into one of the angle combinations, position information of the obstacle may be represented with reference to an actual distance between the obstacle and the unmanned aerial vehicle in this case and an angle combination corresponding to the obstacle. Since the spherical region is established in real time, during flight of the unmanned aerial vehicle, the distance between the unmanned aerial vehicle and each obstacle constantly changes, and an angle combination where the obstacle falls into also changes. Therefore, the obstacle position and the obstacle orientation of each obstacle are updated in real time.

Figure 3:
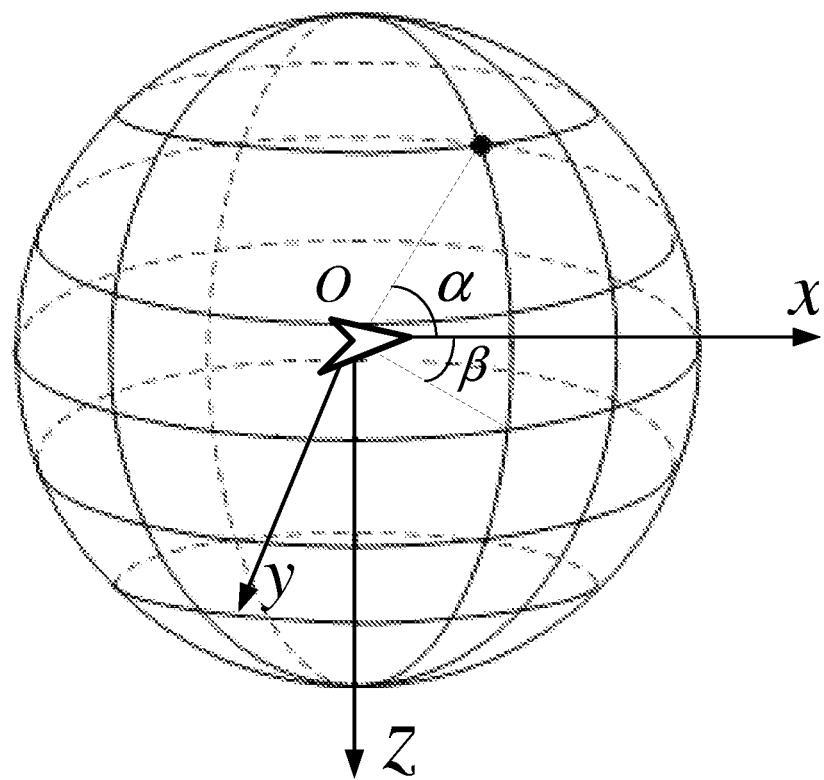
FIG. 3 is a schematic diagram of a method of calculating a push-pull coefficient of each obstacle relative to an unmanned aerial vehicle.

As shown in FIG. 3, the unmanned aerial vehicle is located at the center of sphere, and an obstacle is located at a small black point in the figure. An element is formed by a distance between each obstacle and the unmanned aerial vehicle and an obstacle orientation, and each element may be represented as follows:

$$(\alpha, \beta, d)$$

$\alpha$ is an elevation angle, $\beta$ is a side slip angle, $\alpha$ and $\beta$ being used for representing an obstacle orientation, and d is an actual distance between the unmanned aerial vehicle and each obstacle.

S20: Calculate a push-pull coefficient of each obstacle relative to the unmanned aerial vehicle according to the obstacle position of each obstacle.

The push-pull coefficient is used for reflecting a property whether the obstacle attracts or repels the unmanned aerial vehicle, and each push-pull coefficient has a corresponding orientation. When the push-pull coefficient is greater than or equal to 1, that is, the distance between the unmanned aerial vehicle and the obstacle is less than or equal to a push-pull threshold, an orientation corresponding to the push-pull coefficient is shown as "push" (that is, a repelling effect) in this case, and the unmanned aerial vehicle 100 is far away from the orientation. When the push-pull coefficient is less than 1, that is, the distance between the unmanned aerial vehicle and the obstacle is greater than the push-pull threshold, an orientation corresponding to the push-pull coefficient is shown as "pull" (that is, an attraction effect) in this case, and the unmanned aerial vehicle 100 is close to the orientation.

When the push-pull coefficient is greater than or equal to 1, a greater push-pull coefficient indicates a greater repelling effect shown in the orientation corresponding to the push-pull coefficient and a farther distance between the unmanned aerial vehicle 100 and the orientation. When the push-pull coefficient is less than 1, in a case that the push-pull coefficient is smaller or is closer to 0, it indicates that the attraction effect shown in the orientation corresponding to the push-pull coefficient is greater, and the unmanned aerial vehicle 100 may be closer to the orientation.

Since the unmanned aerial vehicle dynamically flies, to calculate the push-pull coefficient more accurately, calculation may be performed with reference to a flight velocity of the unmanned aerial vehicle. Specifically, a formula for calculating the push-pull coefficient of each obstacle relative to the unmanned aerial vehicle is as follows:

$$pp = \frac{d_{pp}}{\max(d, 0.01)}$$

$$d_{pp} = d_{safe} + V * t_{safe}.$$

pp is a push-pull coefficient of each obstacle, $d_{pp}$ is a push-pull threshold, max (d, 0.01) is a distance between the unmanned aerial vehicle and the obstacle, max (d, 0.01) being calculated according to a current position of the unmanned aerial vehicle and an obstacle position, $d_{safe}$ is a minimum safe distance, $t_{safe}$ is a shortest reserved time, $d_{safe}$ and $t_{safe}$ being preset, and V is a current flight velocity of the unmanned aerial vehicle.

In this embodiment, the obstacles are converted into a push-pull energy field. In an omnidirectional obstacle avoidance method based on the push-pull energy field, it may be ensured that a relatively safe distance is always maintained between the unmanned aerial vehicle and each obstacle, to avoid collision between the unmanned aerial vehicle and each obstacle, so that the unmanned aerial vehicle can avoid static or dynamic obstacles, thereby achieving safe flight.

S30: Obtain a target position and a target orientation of the unmanned aerial vehicle.

The target position is a position at which the unmanned aerial vehicle needs to arrive. The target orientation is an orientation of the position relative to the current position of the unmanned aerial vehicle. The target orientation is also represented by using an elevation angle (or a line-of-sight inclination) and a side slip angle (or a line-of-sight declination).

S40: Calculate a baton coefficient of the target position relative to the unmanned aerial vehicle according to the target position.

The target position and the target orientation are used for guiding flight of the unmanned aerial vehicle, which is equivalent to commanding flight of the unmanned aerial vehicle with a baton.

Figure 4:
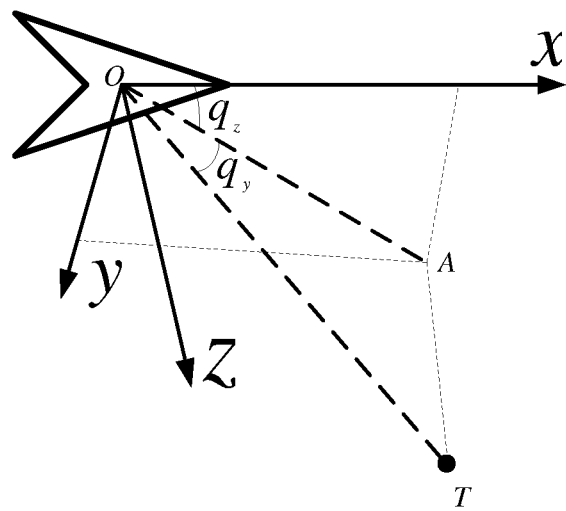
FIG. 4 is a schematic diagram of a method of calculating a baton coefficient of a target position relative to an unmanned aerial vehicle.

As shown in FIG. 4, a point O is a current position of the unmanned aerial vehicle, a point T is a target position, a point A is a projection of the point T on a horizontal plane, $q_y$ is a line-of-sight inclination between the unmanned aerial vehicle and the target position, and $q_z$ is a line-of-sight declination between the unmanned aerial vehicle and the target position. Specifically, a formula for calculating the baton coefficient is as follows:

$$s = \frac{d_{pp}}{\max(|\overrightarrow{OT}|, 0.01)}$$

$$d_{pp} = d_{safe} + V * t_{safe}$$

$$\overrightarrow{OT} = (q_y, q_z, |\overrightarrow{OT}|).$$

s is the baton coefficient, $d_{pp}$ is a push-pull threshold, max ($|\overrightarrow{OT}|$, 0.01) represents a distance between the unmanned aerial vehicle and the target position, an $\overrightarrow{OT}$ vector representing a vector between a point of the unmanned aerial vehicle and a point of the target position, $d_{safe}$ is a minimum safe distance, $t_{safe}$ is a shortest reserved time, V is a current flight velocity of the unmanned aerial vehicle, $q_y$ is a line-of-sight inclination between the unmanned aerial vehicle and the target position, and $q_z$ is a line-of-sight declination between the unmanned aerial vehicle and the target position.

S50: Adjust a flight direction of the unmanned aerial vehicle according to the baton coefficient, the target orientation, the push-pull coefficient of each obstacle relative to the unmanned aerial vehicle, and the obstacle orientation.

The flight direction of the unmanned aerial vehicle is adjusted according to the baton coefficient, the target orientation, the push-pull coefficient of each obstacle relative to the unmanned aerial vehicle and the obstacle orientation, so that the unmanned aerial vehicle may avoid the obstacles in real time during flight, thereby preventing the obstacles from affecting flight of the unmanned aerial vehicle.

In this embodiment of the present invention, according to the push-pull coefficient of each obstacle relative to the unmanned aerial vehicle and the obstacle orientation, the unmanned aerial vehicle flies towards a relatively safe direction, and it can be ensured that a relatively safe distance is maintained between the unmanned aerial vehicle and each obstacle, to avoid a risk of colliding with each obstacle by the unmanned aerial vehicle, so that the unmanned aerial vehicle can avoid static or dynamic obstacles. In addition, with reference to the baton coefficient of the target position relative to the unmanned aerial vehicle and the target orientation, the unmanned aerial vehicle may complete a flight task while achieving safe flight, and there is no need to adopt a complex path planning algorithm according to a plurality of scenarios of the unmanned aerial vehicle in a flight environment, thereby reducing dependence of the path planning algorithm on computing resources. A direction in which the unmanned aerial vehicle can fly may be properly given in real time by converting the obstacles into the push-pull energy field. Moreover, a baton principle and the push-pull energy field are combined, so that the unmanned aerial vehicle achieves avoidance or bypassing of static or dynamic obstacles during autonomous flight, thereby ensuring safety of the unmanned aerial vehicle when flying towards the target position.

Figure 5:
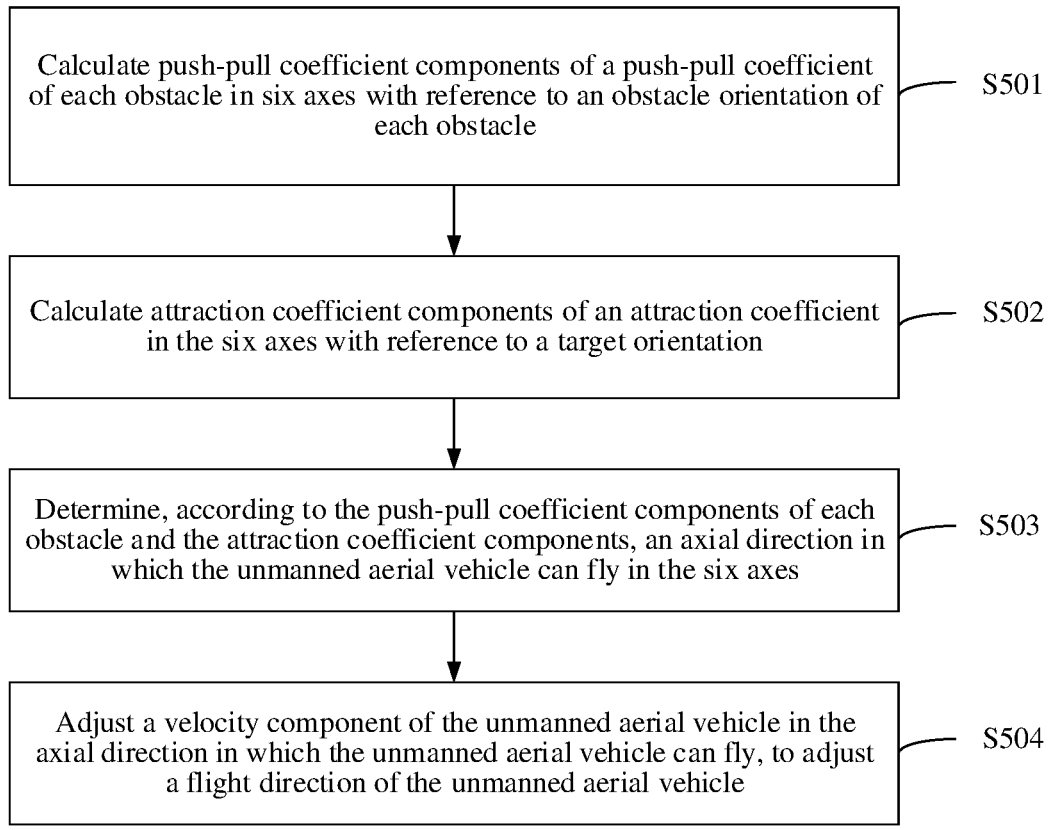
FIG. 5 is a schematic flowchart of step S50 in FIG. 2.

In some embodiments, as shown in FIG. 5, step S50 includes:

S501: Calculate push-pull coefficient components of the push-pull coefficient of each obstacle in six axes with reference to the obstacle orientation of each obstacle.

The six axes are six directions in a three-dimensional coordinate system, including a positive X-axis, a negative X-axis, a positive Y-axis, a negative Y-axis, a positive Z-axis and a negative Z-axis. Since each obstacle is in a three-dimensional space, the push-pull coefficient of each obstacle may be projected to the six axes with reference to the obstacle orientation, to obtain push-pull coefficient components in the six axes. The push-pull coefficient components of each obstacle in the six axes are represented as follows:

$$(pp_x^+, pp_y^+, pp_z^+, pp_x^-, pp_y^-, pp_z^-)$$

For parameters in the foregoing formula, $pp_x^+$ is a push-pull coefficient component obtained by projecting the push-pull coefficient to the positive X-axis, $pp_y^+$ is a push-pull coefficient component obtained by projecting the push-pull coefficient to the positive Y-axis, $pp_z^+$ is a push-pull coefficient component obtained by projecting the push-pull coefficient to the positive Z-axis, $pp_x^-$ is a push-pull coefficient component obtained by projecting the push-pull coefficient to the negative X-axis, $pp_y^-$ is a push-pull coefficient component obtained by projecting the push-pull coefficient to the negative Y-axis, and $pp_z^-$ is a push-pull coefficient component obtained by projecting the push-pull coefficient to the negative Z-axis. For example, assuming that the push-pull coefficient of each obstacle relative to the unmanned aerial vehicle in FIG. 3 is 1, push-pull coefficient components obtained by projecting the push-pull coefficient to the six axes are represented as follows:

$$pp_x^+ = \cos\alpha \cos\beta, pp_y^+ = \cos\alpha \sin\beta \text{ and } pp_z^- = \sin\alpha$$

It is to be noted that, any obstacle may only have projections in three axial directions at most. Therefore, a push-pull coefficient of the obstacle may only have components in three axial directions at most and has no component in at least three other axial directions. The axial directions with no component do not have a value, and a component with no value may be represented by using an unknown X. For example, push-pull coefficient components of one of the obstacles in the six axes is represented as (0.5, 0.4, X, X, X, 0.8), it indicates that a push-pull coefficient component of the obstacle relative to the push-pull coefficient of the unmanned aerial vehicle in the positive X-axis is 0.5, a push-pull coefficient component in the positive Y-axis is 0.4, and a push-pull coefficient component in the negative Z-axis is 0.8. The push-pull coefficient has no projection in other three axial directions, and therefore push-pull coefficient components in the three axial directions are unknown. It may be understood that, push-pull coefficient components of the obstacles with components in the axial directions are positive values, and a value of a push-pull coefficient component in each axial direction represents a push-pull intensity in the axial direction.

S502: Calculate baton coefficient components of the baton coefficient in the six axes with reference to the target orientation.

Since a baton coefficient of the target position relative to the unmanned aerial vehicle has a corresponding target orientation, the baton coefficient of the target position relative to the unmanned aerial vehicle may be projected to the six axes with reference to the target orientation, to obtain the baton coefficient components in the six axes. The baton coefficient components of the target position relative to the baton coefficient of the unmanned aerial vehicle in the six axes are represented as follows:

$$s_x^+, s_y^+, s_z^+, s_x^-, s_y^-, s_z^-)$$

$s_x^+$ is a baton coefficient component obtained by projecting the baton coefficient to the positive X-axis, $s_y^+$ is a baton coefficient component obtained by projecting the baton coefficient to the positive Y-axis, $s_z^+$ is a baton coefficient component obtained by projecting the baton coefficient to the positive Z-axis, $s_x^-$ is a baton coefficient component obtained by projecting the baton coefficient to the negative X-axis, $s_y^-$ is a baton coefficient component obtained by projecting the baton coefficient to the negative Y-axis, and $s_z^-$ is a baton coefficient component obtained by projecting the baton coefficient to the negative Z-axis.

For example, as shown in FIG. 4, push-pull coefficient components obtained by projecting the baton coefficient to the six axes are respectively represented as follows:

$$s_x^+ = |\overline{OT}|\cos q_y \cos q_z, s_y^+ = |\overline{QT}|\cos q_y \sin q_z \text{ and } s_z^+ = |\overline{OT}|\sin q_y$$

It is to be noted that, the baton coefficient of the target position relative to the unmanned aerial vehicle may only have projections in three axial directions at most. Therefore, the baton coefficient may only have components in three axial directions at most and has no component in at least three other axial directions. The axial directions with no component do not have a value, and a component with no value may be represented by an unknown X. For example, the baton coefficient components of the baton coefficient in the six axes are represented as (0.6, 0.8, 1.2, X, X, X), it indicates that a baton coefficient component of the target position relative to the baton coefficient of the unmanned aerial vehicle in the positive X-axis is 0.6, a baton coefficient component in the positive Y-axis is 0.8, and a baton coefficient component in the positive Z-axis is 1.2. The baton coefficient has no projection in other three axial directions, and therefore baton coefficient components in the three axial directions are unknown. It may be understood that, baton coefficient components of the obstacles with components in the axial directions are positive values, and a value of a baton coefficient component in each axial direction represents a baton attraction intensity in the axial direction.

S503: Determine, according to the push-pull coefficient components of each obstacle and the baton coefficient components, an axial direction in which the unmanned aerial vehicle can fly in the six axes.

The axial direction in which the unmanned aerial vehicle can fly in the six axes is determined according to the push-pull coefficient component and the baton coefficient component, to ensure that the unmanned aerial vehicle flies with no problem in the axial direction.

Figure 6:
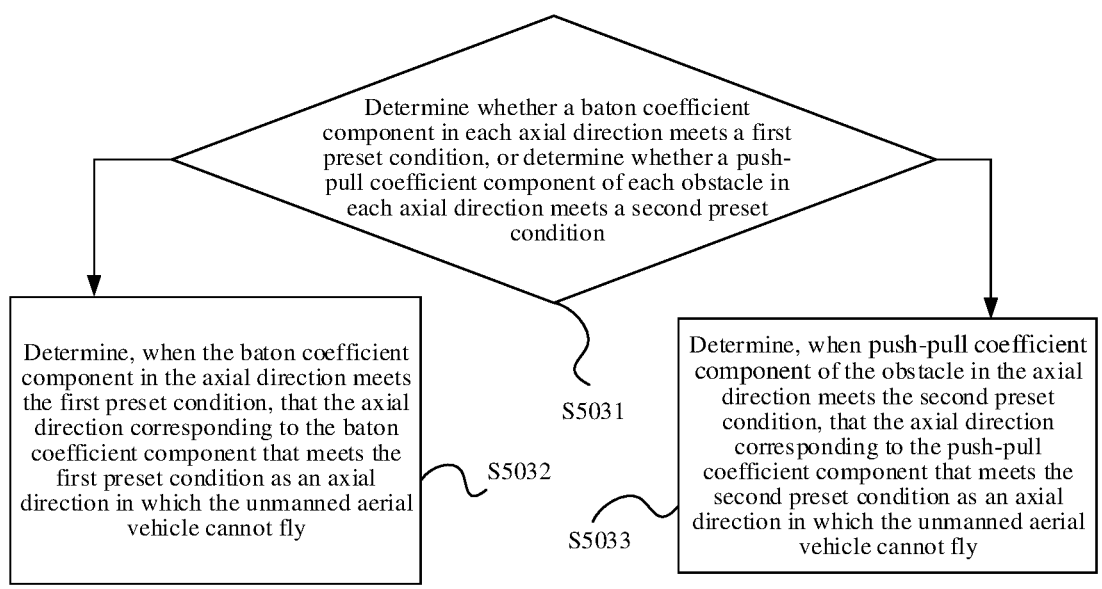
FIG. 6 is a schematic flowchart of step S503 in FIG. 5.

Specifically, as shown in FIG. 6, the step of determining, according to the push-pull coefficient components of each obstacle and the baton coefficient components, an axial direction in which the unmanned aerial vehicle can fly in the six axes includes:

S5031: Determine whether a baton coefficient component in each axial direction meets a first preset condition, or determine whether a push-pull coefficient component of each obstacle in each axial direction meets a second preset condition.

S5032: Determine, when the baton coefficient component in the axial direction meets the first preset condition, that the axial direction corresponding to the baton coefficient component that meets the first preset condition as an axial direction in which the unmanned aerial vehicle cannot fly.

The unmanned aerial vehicle may lose a target during autonomous flight, that is, there is case that the baton coefficient component projected by the target position relative to the baton coefficient of the unmanned aerial vehicle in the six axes is equal to 0 in any axial direction or a symmetric axial direction thereof. In a case that the unmanned aerial vehicle may lose a target in any axial direction, the unmanned aerial vehicle cannot continue to fly towards such an axial direction. Therefore, whether each baton coefficient component meets the first preset condition needs to be determined, to determine whether an axial direction corresponding to the baton coefficient component is an axial direction in which the unmanned aerial vehicle can fly or not. The first preset condition is that a baton coefficient component of any axial direction or a symmetric axial direction thereof is equal to 0. For example, when $s_x^+$ or $s_x^-$ is equal to 0, it indicates that the unmanned aerial vehicle may lose a target in an X-axis direction, and the unmanned aerial vehicle cannot fly in an X-axis in this case. When $s_y^+$ or $s_y^-$ is equal to 0, it indicates that the unmanned aerial vehicle may lose a target in a Y-axis direction, and the unmanned aerial vehicle cannot fly in a Y-axis in this case. When $s_z^+$ or $s_z^-$ is equal to 0, it indicates that the unmanned aerial vehicle may lose a target in a Z-axis direction, and the unmanned aerial vehicle cannot fly in a Z-axis in this case.

S5033: Determine, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

Since each push-pull coefficient component is obtained by projecting the push-pull coefficient of each obstacle relative to the unmanned aerial vehicle in the six axes, that is, an orientation corresponding to each push-pull coefficient component is reflected in the six axes, whether each push-pull coefficient component of each obstacle in each axial direction meets the second preset condition is determined, to determine whether an axial direction corresponding to the push-pull coefficient component is an axial direction in which the unmanned aerial vehicle cannot fly, thereby presenting, on the whole, whether the orientation corresponding to the push-pull coefficient of each obstacle relative to the unmanned aerial vehicle is a "push" effect or a "pull" effect.

For example, the second preset condition may be set to that whether the push-pull coefficient component is greater than or equal to 1, that is, when $pp_x^+ \geq 1$, it may be determined that the positive X-axis is an axial direction in which the unmanned aerial vehicle cannot fly. When $pp_y^+ \geq 1$, it may be determined that the positive Y-axis is an axial direction in which the unmanned aerial vehicle cannot fly. When $pp_z^+ \geq 1$, it may be determined that the positive Z-axis is an axial direction in which the unmanned aerial vehicle cannot fly. When $pp_x^- \geq 1$, it may be determined that the negative X-axis is an axial direction in which the unmanned aerial vehicle cannot fly. When $pp_y^- \geq 1$, it may be determined that the negative Y-axis is an axial direction in which the unmanned aerial vehicle cannot fly. When $pp_z^- \geq 1$, it may be determined that the negative Z-axis is an axial direction in which the unmanned aerial vehicle cannot fly.

It may be understood that, there may be a plurality of obstacles with a preset range around the unmanned aerial vehicle. In this case, there may be a plurality of push-pull coefficient components corresponding to any axial direction, and as long as there is one push-pull coefficient component greater than or equal to 1 in the axial direction, it may be determined that the axial direction is an axial direction in which the unmanned aerial vehicle cannot fly.

In some embodiments, the unmanned aerial vehicle keeps hovering when each push-pull coefficient component of each obstacle in each axial direction meets the second preset condition, that is, each push-pull coefficient component in each axial direction is greater than or equal to 1.

In this embodiment, whether each push-pull coefficient component of each obstacle in each axial direction meets the second preset condition is determined. If the push-pull coefficient component of the obstacle meets the second preset condition, it may be determined that an axial direction corresponding to the push-pull coefficient component that meets the second preset condition is an axial direction in which the unmanned aerial vehicle cannot fly, to avoid a risk of colliding with each obstacle by the unmanned aerial vehicle when flying in the axial direction in which the unmanned aerial vehicle cannot fly, thereby ensuring safe flight of the unmanned aerial vehicle.

Figure 7:
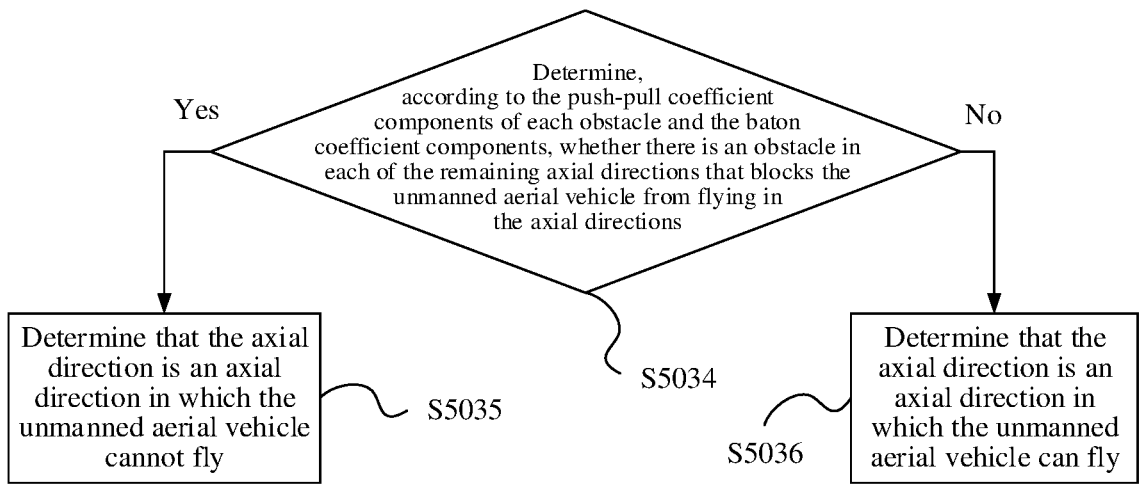
FIG. 7 is a further schematic flowchart of step S503 in FIG. 5.

Specifically, as shown in FIG. 7, the step of determining, according to the push-pull coefficient components of each obstacle and the baton coefficient components, an axial direction in which the unmanned aerial vehicle can fly in the six axes further includes:

S5034: Determine, according to the push-pull coefficient components of each obstacle and the baton coefficient components, whether there is an obstacle in each of the remaining axial directions that blocks the unmanned aerial vehicle from flying in the axial directions.

S5035: When there is a blocking obstacle in the axial direction, it is determined that the axial direction is an axial direction in which the unmanned aerial vehicle cannot fly.

S5036: When there is no blocking obstacle in the axial direction, it is determined that the axial direction is an axial direction in which the unmanned aerial vehicle can fly.

In this embodiment, when there is an axial direction in the six axes but there is no baton coefficient component that meets the first preset condition, and there is an axial direction in the six axes but there is no push-pull coefficient component that meet the second preset condition, "remaining axial directions" may be obtained in this case, that is, axial directions other than the axial directions determined with reference to the first preset condition and the second preset condition. Since the remaining axial directions are only candidate axial directions in which the unmanned aerial vehicle can fly, a blocking obstacle may also exist in the remaining axial directions. If a blocking obstacle exist in any axial direction, it indicates that there is a risk of colliding with the obstacles by the unmanned aerial vehicle when flying in the axial direction. Therefore, the remaining axial directions may also be axial directions in which the unmanned aerial vehicle cannot fly, and whether there is an obstacle that blocks flight of the unmanned aerial vehicle in the remaining axial directions needs to be further determined. When there is a blocking obstacle in the axial direction, it is determined that the axial direction is an axial direction in which the unmanned aerial vehicle cannot fly. When there is no blocking obstacle in the axial direction, it is determined that the axial direction is an axial direction in which the unmanned aerial vehicle can fly.

Therefore, in such a manner, when executing a flight task, the unmanned aerial vehicle may avoid, based on a push-pull energy field, static or dynamic obstacles in a flight path of the unmanned aerial vehicle towards a target, thereby ensuring that the unmanned aerial vehicle safely complete the flight task without collision.

Figure 8:
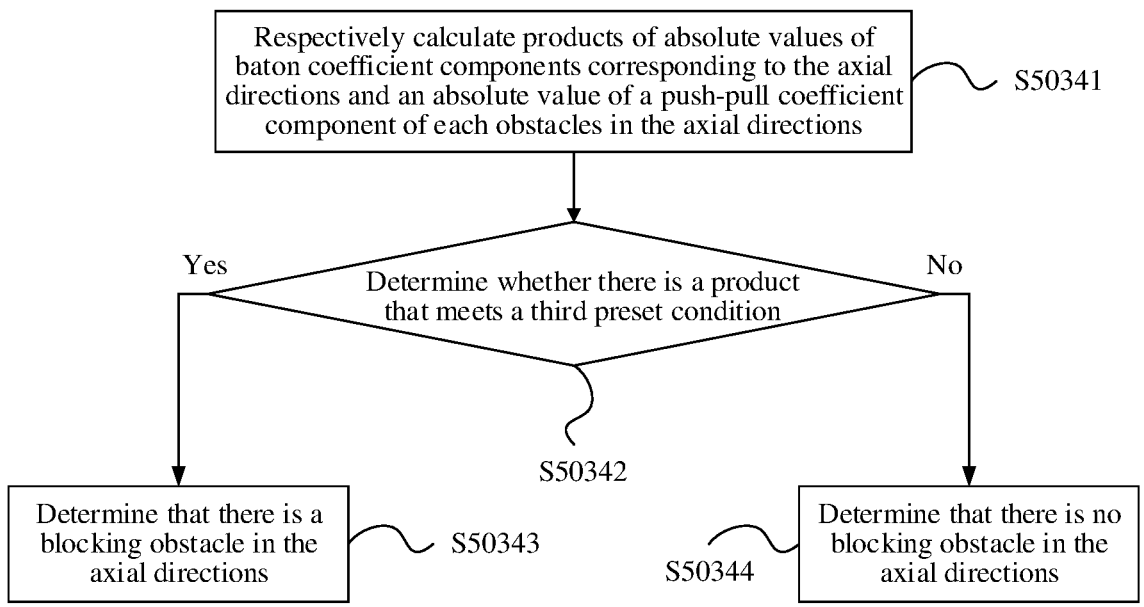
FIG. 8 is a schematic flowchart of step S5034 in FIG. 7.

Specifically, as shown in FIG. 8, step S5034 further includes:

S50341: Respectively calculate products of the baton coefficient components corresponding to the axial directions and the push-pull coefficient component of each obstacles in the axial directions.

S50342: Determine whether there is a product that meets a third preset condition.

S50343: Determine that there is no blocking obstacle in the axial directions when there is no product that meets the third preset condition.

S50344: Determine that there is no blocking obstacle in the axial directions when there is no product that meets the third preset condition.

With reference to steps S5031 to S5033, a baton coefficient component corresponding to an axial direction indicates that the baton coefficient component in the axial direction is not equal to 0, and a push-pull coefficient component of each obstacle in the axial direction is less than 1. Whether there is a blocking obstacle in the axial direction is determined by determining whether a product obtained by multiplying the baton coefficient component corresponding to the axial direction by the push-pull coefficient component less than 1 in the axial direction meets the third preset condition.

For example, the third preset condition is set to that a product of a baton coefficient component not equal to 0 in any axial direction in the remaining axial directions and the baton coefficient component less than 1 in the axial direction is greater than or equal to 1, that is, when $s_x^+ \sqcap pp_x^+ \geq 1$, it may be determined that there is a blocking obstacle in the positive X-axis, or otherwise, it may be determined that there is no blocking obstacle in the positive X-axis. When $s_y^+ \sqcap pp_y^+ \geq 1$, it may be determined that there is a blocking obstacle in the positive Y-axis, or otherwise, it may be determined that there is no blocking obstacle in the positive Y-axis. When $s_z^+ \sqcap pp_z^+ \geq 1$, it may be determined that there is a blocking obstacle in the positive Z-axis, or otherwise, it may be determined that there is no blocking obstacle in the positive Z-axis. When $s_x^- \sqcup pp_x^- \geq 1$, it may be determined that there is a blocking obstacle in the negative X-axis, or otherwise, it may be determined that there is no blocking obstacle in the negative X-axis. When $s_y^- \sqcap pp_y^- \geq 1$, it may be determined that there is a blocking obstacle in the negative Y-axis, or otherwise, it may be determined that there is no blocking obstacle in the negative Y-axis. When $s_z^- \square pp_z^- \geq 1$, it may be determined that there is a blocking obstacle in the negative Z-axis, or otherwise, it may be determined that there is no blocking obstacle in the negative Z-axis.

S504: Adjust a velocity component of the unmanned aerial vehicle in the axial direction in which the unmanned aerial vehicle can fly, to adjust the flight direction of the unmanned aerial vehicle.

After an axial direction in which the unmanned aerial vehicle can fly in the six axes is determined, the flight direction or a flight trajectory of the unmanned aerial vehicle cannot be directly determined, and the velocity component of the unmanned aerial vehicle in the axial direction in which the unmanned aerial vehicle can fly needs to be further adjusted, thereby adjusting the flight direction of the unmanned aerial vehicle.

Figure 9:
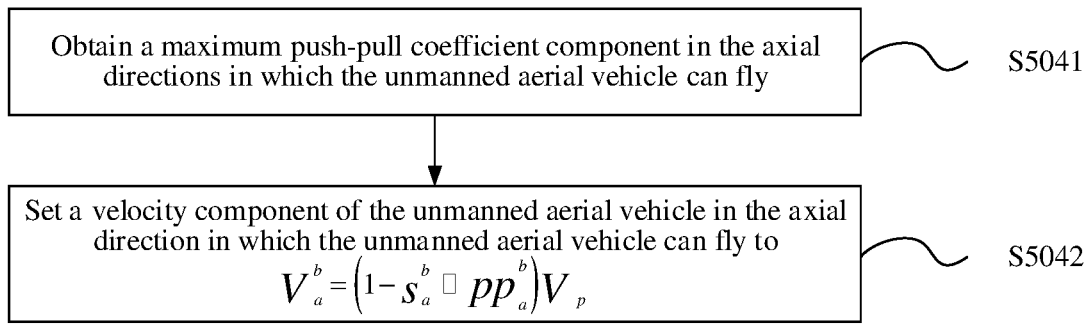
FIG. 9 is a schematic flowchart of step S504 in FIG. 5.

In some embodiments, as shown in FIG. 9, step S504 includes:

S5041: Obtain a maximum push-pull coefficient component in the axial directions in which the unmanned aerial vehicle can fly.

S5042: Set the velocity component of the unmanned aerial vehicle in the axial direction in which the unmanned aerial vehicle can fly to:

$$V_a^b = (1 - s_a^b \sqcap pp_a^b) V_p$$

$s_a^b$ is the baton coefficient component, $pp_a^b$ is a maximum push-pull coefficient component in the axial direction in which the unmanned aerial vehicle can fly, and $V_p$ is a preset velocity.

For example, assuming that the positive X-axis and the positive Y-axis are axial directions in which the unmanned aerial vehicle can fly, and maximum push-pull coefficient components of the positive X-axis and the positive Y-axis (where when there is only one push-pull coefficient component in the axial direction, the push-pull coefficient component is used as a maximum push-pull coefficient component) are $pp_x^+$ and $pp_y^+$, and $$s_x^+ \sqcap pp_x^+ = 0.6, s_y^+ \sqcap pp_y^+ = 0.8,$$

a velocity component in the positive X-axis is as follows:

$$V_x^+ = (1 - 0.6) V_p = 0.4 V_p, \text{ and}$$

a velocity component in the positive Y-axis is as follows:

$$V_y^+ = (1 - 0.8) V_p = 0.2 V_p,$$

An actual flight direction and an actual flight velocity of the unmanned aerial vehicle may be determined by superimposing the velocity component in the positive X-axis with the velocity component in the positive Y-axis.

It is to be noted that, it may be determined that the unmanned aerial vehicle has entered a dead zone when a product of a baton coefficient component that does not meet the first preset condition in any axial direction of the six axes and a push-pull coefficient component of each obstacle that does not meet the second preset condition in the axial direction meets the third preset condition.

After it is determined that the unmanned aerial vehicle has entered the dead zone, whether there is an axial direction in which the unmanned aerial vehicle can fly is continuously determined according to the foregoing method.

When there is an axial direction in which the unmanned aerial vehicle can fly, the velocity component of the unmanned aerial vehicle in the axial direction in which the unmanned aerial vehicle can fly is set to:

$$V_a^b = 0.5 V_p (1 - pp_a^b)$$

$V_P$ is a preset velocity, and $pp_a^b$ is a push-pull coefficient component of an axial direction in which the unmanned aerial vehicle can fly.

The unmanned aerial vehicle keeps hovering if there is no axial direction in which the unmanned aerial vehicle can fly.

It may be understood that, when $s_x^+ \sqsubset pp_x^+ \geq 1$, $s_y^+ \square pp_y^+ \geq 1$, $s_z^+ \mid pp_z^+ \geq 1$, $s_x^- \mid pp_x^- \geq 1$, $s_y^- \mid pp_y^- \geq 1$ and $s_z^- \mid pp_z^- \geq 1$, the positive X-axis, the negative X-axis, the positive Y-axis, the negative Y-axis, the positive Z-axis and the negative Z-axis are all axial directions in which the unmanned aerial vehicle cannot fly, and the unmanned aerial vehicle keeps hovering in this case.

When the unmanned aerial vehicle keeps hovering, if there is a push-pull coefficient component less than 1 in any direction in the six axes, or on the basis of step S5034, the product of the baton coefficient component that does not meet the first preset condition in any axial direction of the six axes and the push-pull coefficient component of each obstacle that does not meet the second preset condition in the axial direction is determined again. If there is a product that meets the third preset condition in any direction of the six axes, a velocity component of the axial direction is set as $V_a^b = 0.5 V_p (1 - pp_a^b)$. If there is a product that meets the third preset condition in a plurality of direction of the six axes, velocity components of the plurality of directions are all set as $V_a^b = 0.5 V_p (1 - pp_a^b)$. In this case, the velocity components of the plurality of directions may be superimposed, to determine the actual flight direction and the actual flight velocity of the unmanned aerial vehicle.

In this embodiment, the unmanned aerial vehicle can make a detour after entering the dead zone, so that the unmanned aerial vehicle can complete the flight task.

Figure 10:
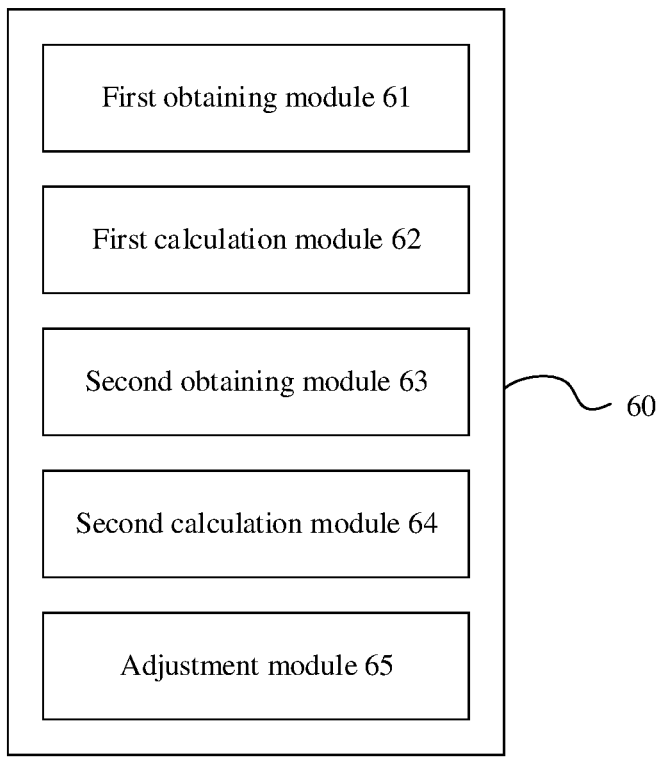
FIG. 10 is a schematic structural diagram of a flight control apparatus for an unmanned aerial vehicle according to an embodiment of the present invention.

Referring to FIG. 10, FIG. 10 is a schematic structural diagram of a flight control apparatus for an unmanned aerial vehicle according to an embodiment of the present invention. As shown in FIG. 10, the apparatus 60 includes a first obtaining module 61, a first calculation module 62, a second obtaining module 63, a second calculation module 64 and an adjustment module 65. a first obtaining module 61, configured to obtain an obstacle position and an obstacle orientation of each obstacle within a preset range around the unmanned aerial vehicle; a first calculation module 62, configured to calculate a push-pull coefficient of each obstacle relative to the unmanned aerial vehicle according to the obstacle position of each obstacle; a second obtaining module 63, configured to obtain a target position and a target orientation of the unmanned aerial vehicle; a second calculation module 64, configured to calculate a baton coefficient of the target position relative to the unmanned aerial vehicle according to the target position; and an adjustment module 65, configured to adjust a flight direction of the unmanned aerial vehicle according to the baton coefficient, the target orientation, the push-pull coefficient of each obstacle relative to the unmanned aerial vehicle, and the obstacle orientation.

Figure 11:
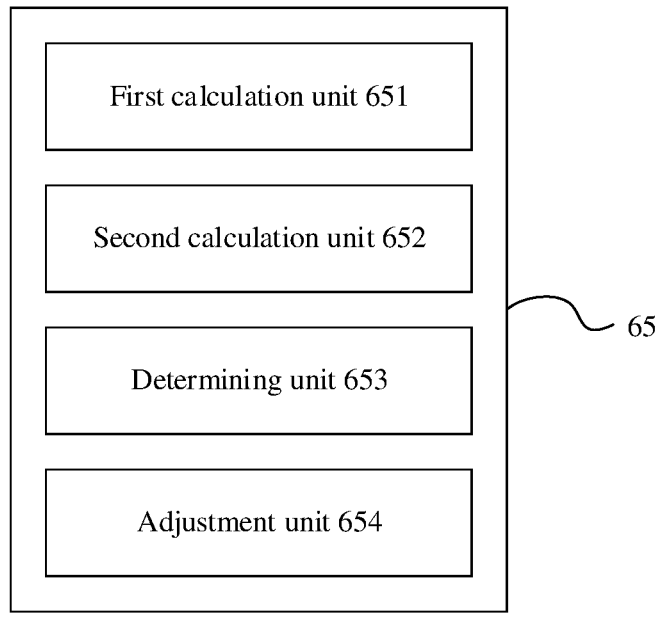
FIG. 11 is a schematic structural diagram of an adjustment module in FIG. 10.

Referring to FIG. 11, FIG. 11 is a schematic structural diagram of an adjustment module in FIG. 10. As shown in FIG. 11, the adjustment module 65 includes a first calculation unit 651, a second calculation unit 652, a determining unit 653 and an adjustment unit 654. The first calculation unit 651 may calculate push-pull coefficient components of the push-pull coefficient of each obstacle in six axes with reference to the obstacle orientation of each obstacle. The second calculation unit 652 may calculate baton coefficient components of the baton coefficient in the six axes with reference to the target orientation. The determining unit 653 is configured to determine, according to the push-pull coefficient components of each obstacle and the baton coefficient components, an axial direction in which the unmanned aerial vehicle can fly in the six axes. The adjustment unit 654 is configured to adjust a velocity component of the unmanned aerial vehicle in the axial direction in which the unmanned aerial vehicle can fly, to adjust the flight direction of the unmanned aerial vehicle.

The determining unit 653 is further configured to: determine whether a baton coefficient component in each axial direction meets a first preset condition, or determine whether a push-pull coefficient component of each obstacle in each axial direction meets a second preset condition; determine, when the baton coefficient component in the axial direction meets the first preset condition, that the axial direction corresponding to the baton coefficient component that meets the first preset condition as an axial direction in which the unmanned aerial vehicle cannot fly; and determine, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

The determining unit 653 is further configured to: determine, according to the push-pull coefficient components of each obstacle and the baton coefficient components, whether there is an obstacle in each of the remaining axial directions that blocks the unmanned aerial vehicle from flying in the axial directions; determine, when there is a blocking obstacle in the axial direction, that the axial direction is an axial direction in which the unmanned aerial vehicle cannot fly; and determine, when there is no blocking obstacle in the axial direction, that the axial direction is an axial direction in which the unmanned aerial vehicle can fly.

The determining unit 653 is further configured to: respectively calculate products of the baton coefficient components corresponding to the axial directions and the push-pull coefficient component of each obstacles in the axial directions; determine whether there is a product that meets a third preset condition; determine that there is no blocking obstacle in the axial directions when there is no product that meets the third preset condition; and determine that there is no blocking obstacle in the axial directions when there is no product that meets the third preset condition.

Figure 12:
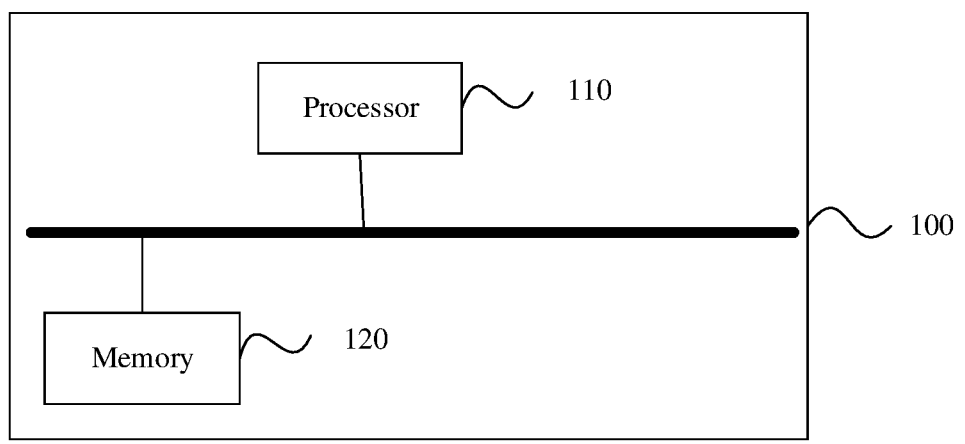
FIG. 12 is a schematic structural diagram of hardware of an unmanned aerial vehicle according to an embodiment of the present invention.

Referring to FIG. 12, FIG. 12 is a schematic structural diagram of hardware of an unmanned aerial vehicle according to an embodiment of the present invention. As shown in FIG. 12, the unmanned aerial vehicle 100 includes one or more processors 110 and a memory 120. In FIG. 12, one processor 110 is used as an example.

The processor 110 and the memory 120 may be connected through a bus or in other manners and are, for example, connected through a bus in FIG. 12.

As a non-volatile computer-readable storage medium, the memory 120 may be configured to store a non-volatile software program, a non-volatile computer executable program, a module and the like, for example, program instructions corresponding to the flight control method for an unmanned aerial vehicle and the modules (for example, the first obtaining module 61, the first calculation module 62, the second obtaining module 63, the second calculation module 64, the adjustment module 65 and the like) corresponding to the flight control apparatus for an unmanned aerial vehicle in the foregoing embodiments of the present invention. The processor 110 executes various functional applications and data processing of the flight control method for an unmanned aerial vehicle by executing a non-volatile software program, an instruction and a module stored in the memory 120, that is, implements the flight control method for an unmanned aerial vehicle in the above method embodiment and the functions of the modules of the above apparatus embodiment.

The memory 120 may include a program storage area and a data storage area. The program storage area may store an operating system and an application program that is required for at least one function. The storage data area may store data and the like created according to use of the flight control apparatus for an unmanned aerial vehicle.

The storage data area further stores preset data, for example, a preset velocity and the like.

In addition, the memory 120 may include a high-speed random access memory, and may further include a non-volatile memory, such as at least one magnetic disk storage device, a flash memory, or another non-volatile solid-state storage device. In some embodiments, the memory 120 includes memories remotely disposed relative to the processor 110, and these remote memories may be connected to the processor 110 through a network. Examples of the network include, but are not limited to, the Internet, an intranet, a local area network, a mobile communication network and a combination thereof.

The program instructions and one or more modules are stored in the memory 120, and the program instructions and the one or more modules, when executed by the one or more processors 110, perform steps of the flight control method for an unmanned aerial vehicle in any of the foregoing method embodiments, or implement functions of the modules of the flight control apparatus for an unmanned aerial vehicle in any of the foregoing apparatus embodiments.

For the foregoing product, the method provided in the embodiments of the present invention may be performed, and the corresponding functional modules for performing the method and beneficial effects thereof are provided. For technical details not described in detail in this embodiment, reference may be made to the method provided in the foregoing embodiments of the present invention.

An embodiment of the present invention further provides a non-volatile computer-readable storage medium, storing computer-executable instructions. The computer-executable instructions, when executed by one or more processors such as one processor 110 in FIG. 12, may cause a computer to perform steps of the flight control method for an unmanned aerial vehicle in any of the foregoing method embodiments, or implement functions of the modules of the flight control apparatus for an unmanned aerial vehicle in any of the foregoing apparatus embodiments.

An embodiment of the present invention further provides a computer program product, including a computer program stored on a non-volatile computer-readable storage medium. The computer program includes program instructions, and the program instructions, when executed by one or more processors such as one processor 110 in FIG. 12, may cause a computer to perform steps of the flight control method for an unmanned aerial vehicle in any of the foregoing method embodiments, or implement functions of the modules of the flight control apparatus for an unmanned aerial vehicle in any of the foregoing apparatus embodiments.

The described apparatus embodiment is merely an example. The modules described as separate parts may or may not be physically separate, and parts displayed as modules may or may not be physical units, may be located in one position, or may be distributed on a plurality of network units. Some or all of the modules may be selected according to actual needs to implement the objectives of the solutions of the embodiments.

Through the description of the foregoing embodiments, a person skilled in the art may clearly understand that the embodiments may be implemented by software in combination with a universal hardware platform, and may certainly be implemented by hardware. A person of ordinary skill in the art may understand that all or some of the processes of the methods in the foregoing embodiments may be implemented by a computer program instructing relevant hardware. The program may be stored in a computer-readable storage medium. During execution of the program, processes of the foregoing method embodiments may be included. The foregoing storage medium may be a magnetic disk, an optical disc, a read-only memory (ROM), a random access memory (RAM) or the like.

The foregoing descriptions are embodiments of the present invention, and the protection scope of the present invention is not limited thereto. All equivalent structure or process changes made according to the content of this specification and accompanying drawings in the present invention or by directly or indirectly applying the present invention in other related technical fields shall fall within the protection scope of the present invention.

Finally, it is to be noted that, the present invention may be implemented in various different forms, and is not limited to the embodiments described in the present invention. These embodiments are not intended to be an additional limitation on the content of the present invention, and are described for the purpose of providing a more thorough and comprehensive understanding of the content disclosed in the present invention. In addition, under the concept of the present invention, the foregoing technical features continue to be combined with each other, and there are many other changes in different aspects of the present invention as described above, which are all construed as falling within the scope described in this specification of the present invention. Further, a person of ordinary skill in the art may make improvements or modifications according to the foregoing description, and all of the improvements and modifications should all fall within the protection scope of the attached claims of the present invention.

What is claimed is:

1. A flight control method for an unmanned aerial vehicle moving in a flight direction, comprising:
    obtaining an obstacle position and an obstacle orientation of each obstacle within a preset range around the unmanned aerial vehicle;
    calculating a push-pull coefficient of each obstacle relative to the unmanned aerial vehicle according to the obstacle position of each obstacle;
    obtaining a target position and a target orientation of the unmanned aerial vehicle;

calculating a baton coefficient of the target position relative to the unmanned aerial vehicle according to the target position; and adjusting the flight direction of the unmanned aerial vehicle by adjusting an adjustment module according to the baton coefficient, the target orientation, the push-pull coefficient of each obstacle relative to the unmanned aerial vehicle, and the obstacle orientation, wherein the adjustment module is configured to adjust the flight direction of the unmanned aerial vehicle; and wherein the adjusting a flight direction of the unmanned aerial vehicle according to the baton coefficient, the target orientation, the push-pull coefficient of each obstacle relative to the unmanned aerial vehicle, and the obstacle orientation comprises:

calculating push-pull coefficient components of the push-pull coefficient of each obstacle in six axes with reference to the obstacle orientation of each obstacle;

calculating baton coefficient components of the baton coefficient in the six axes with reference to the target orientation;

determining, according to the push-pull coefficient components of each obstacle and the baton coefficient components, an axial direction in which the unmanned aerial vehicle can fly in the six axes;

adjusting a velocity component of the unmanned aerial vehicle in the axial direction in which the unmanned aerial vehicle can fly, to adjust the flight direction of the unmanned aerial vehicle; and flying the unmanned aerial vehicle based on the adjusted flight direction.

2. The flight control method for an unmanned aerial vehicle according to claim 1, wherein the determining, according to the push-pull coefficient components of each obstacle and the baton coefficient components, an axial direction in which the unmanned aerial vehicle can fly in the six axes comprises:

determining whether a baton coefficient component in each axial direction meets a first preset condition, or determining whether a push-pull coefficient component of each obstacle in each axial direction meets a second preset condition;

determining, when the baton coefficient component in the axial direction meets the first preset condition, that the axial direction corresponding to the baton coefficient component that meets the first preset condition as an axial direction in which the unmanned aerial vehicle cannot fly; and determining, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

3. The flight control method for an unmanned aerial vehicle according to claim 2, wherein the determining, according to the push-pull coefficient components of each obstacle and the baton coefficient components, an axial direction in which the unmanned aerial vehicle can fly in the six axes comprises:

determining, according to the push-pull coefficient components of each obstacle and the baton coefficient components, whether there is an obstacle in each of the remaining axial directions that blocks the unmanned aerial vehicle from flying in the axial directions;

determining, when there is a blocking obstacle in the axial direction, that the axial direction is an axial direction in which the unmanned aerial vehicle cannot fly; and determining, when there is no blocking obstacle in the axial direction, that the axial direction is an axial direction in which the unmanned aerial vehicle can fly.

4. The flight control method for an unmanned aerial vehicle according to claim 3, wherein the determining whether there is an obstacle in each of the remaining axial directions that blocks the unmanned aerial vehicle from flying in the axial direction comprises:

respectively calculating products of the baton coefficient components corresponding to the axial directions and the push-pull coefficient component of each obstacles in the axial directions;

determining whether there is a product that meets a third preset condition;

determining that there is a blocking obstacle in the axial directions when there is a product that meets the third preset condition; and determining that there is no blocking obstacle in the axial directions when there is no product that meets the third preset condition.

5. The method according to claim 1, wherein the adjusting a velocity component of the unmanned aerial vehicle in the axial direction in which the unmanned aerial vehicle can fly comprises:

obtaining a maximum push-pull coefficient component in the axial directions in which the unmanned aerial vehicle can fly; and setting the velocity component of the unmanned aerial vehicle in the axial direction in which the unmanned aerial vehicle can fly to:

$V_a^b = (1 - S_a^b \cdot pp_a^b) V_p$ wherein $S_a^b$ is the baton coefficient component, $pp_a^b$ is a maximum push-pull coefficient component in the axial direction in which the unmanned aerial vehicle can fly, and $V_p$ is a preset velocity.

6. The flight control method for an unmanned aerial vehicle according to claim 1, wherein in the step of calculating a push-pull coefficient of each obstacle relative to the unmanned aerial vehicle according to the obstacle position of each obstacle, the push-pull coefficient is calculated as follows:

$$pp = \frac{d_{pp}}{\max(d, 0.01)}$$

$$d_{pp} = d_{safe} + V * t_{safe}$$

wherein pp is a push-pull coefficient of each obstacle, $d_{pp}$ is a push-pull threshold, max(d, 0.01) represents a distance between the unmanned aerial vehicle and the obstacle, $d_{safe}$ is a minimum safe distance, $t_{safe}$ is a shortest reserved time, and V is a current flight velocity of the unmanned aerial vehicle.

7. The method according to claim 1, wherein in the step of calculating a baton coefficient of the target position relative to the unmanned aerial vehicle according to the target position, the baton coefficient is calculated as follows:

$$s = \frac{d_{pp}}{\max\left(|\overrightarrow{OT}|, 0.01\right)}$$

-continued $$d_{pp} = d_{safe} + V * t_{safe}$$

$$\overrightarrow{OT} = (q_y, q_z, |\overrightarrow{OT}|)$$

wherein s is the baton coefficient, $d_{pp}$ is a push-pull threshold, max($|\overrightarrow{OT}|$, 0.01) represents a distance between the unmanned aerial vehicle and the target position, an $\overrightarrow{OT}$ vector representing a vector between a point of the unmanned aerial vehicle and a point of the target position, $d_{safe}$ is a minimum safe distance, $t_{safe}$ is a shortest reserved time, V is a current flight velocity of the unmanned aerial vehicle, $q_y$ is a line-of-sight inclination between the unmanned aerial vehicle and the target position, and $q_z$ is a line-of-sight declination between the unmanned aerial vehicle and the target position.

8. The flight control method for an unmanned aerial vehicle according to claim 1, wherein the step of obtaining an obstacle position and an obstacle orientation of each obstacle within a preset range around the unmanned aerial vehicle further comprises:
   obtaining depth maps acquired by depth sensors arranged around a vehicle body of the unmanned aerial vehicle; and
   recognizing obstacles within the preset range around the unmanned aerial vehicle, and the obstacle position and the obstacle orientation of each obstacle according to the depth maps.

9. A flight control apparatus for an unmanned aerial vehicle moving in a flight direction, comprising:
   an adjustment module configured to adjust the flight direction of the unmanned aerial vehicle;
   at least one processor; and
   a memory communicatively connected to the at least one processor, wherein the memory stores instructions executable by the at least one processor, and the instructions are executed by the at least one processor to cause the at least one processor to:
      obtain an obstacle position and an obstacle orientation of each obstacle within a preset range around the unmanned aerial vehicle;
      calculate a push-pull coefficient of each obstacle relative to the unmanned aerial vehicle according to the obstacle position of each obstacle;
      obtain a target position and a target orientation of the unmanned aerial vehicle;
      calculate a baton coefficient of the target position relative to the unmanned aerial vehicle according to the target position; and
      adjust the flight direction of the unmanned aerial vehicle by adjusting the adjustment module according to the baton coefficient, the target orientation, the push-pull coefficient of each obstacle relative to the unmanned aerial vehicle, and the obstacle orientation;
   wherein the at least one processor is further configured to:
      calculate push-pull coefficient components of the push-pull coefficient of each obstacle in six axes with reference to the obstacle orientation of each obstacle;
      calculate baton coefficient components of the baton coefficient in the six axes with reference to the target orientation;
      determine, according to the push-pull coefficient components of each obstacle and the baton coefficient components, an axial direction in which the unmanned aerial vehicle can fly in the six axes;
      adjust a velocity component of the unmanned aerial vehicle in the axial direction in which the unmanned aerial vehicle can fly, to adjust the flight direction of the unmanned aerial vehicle; and
      flying the unmanned aerial vehicle based on the adjusted flight direction.

10. The flight control apparatus for an unmanned aerial vehicle according to claim 9, wherein the at least one processor is further configured to:
    determine whether a baton coefficient component in each axial direction meets a first preset condition, or determine whether a push-pull coefficient component of each obstacle in each axial direction meets a second preset condition;
    determine, when the baton coefficient component in the axial direction meets the first preset condition, that the axial direction corresponding to the baton coefficient component that meets the first preset condition as an axial direction in which the unmanned aerial vehicle cannot fly; and
    determine, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

11. The flight control apparatus for an unmanned aerial vehicle according to claim 10, wherein the at least one processor is further configured to:
    determine, according to the push-pull coefficient components of each obstacle and the baton coefficient components, whether there is an obstacle in each of the remaining axial directions that blocks the unmanned aerial vehicle from flying in the axial directions;
    determine, when there is a blocking obstacle in the axial direction, that the axial direction is an axial direction in which the unmanned aerial vehicle cannot fly; and
    determine, when there is no blocking obstacle in the axial direction, that the axial direction is an axial direction in which the unmanned aerial vehicle can fly.

12. The flight control apparatus for an unmanned aerial vehicle according to claim 11, wherein the at least one processor is further configured to:
    respectively calculate products of the baton coefficient components corresponding to the axial directions and the push-pull coefficient component of each obstacles in the axial directions;
    determine whether there is a product that meets a third preset condition;
    determine that there is a blocking obstacle in the axial directions when there is a product that meets the third preset condition; and
    determine that there is no blocking obstacle in the axial directions when there is no product that meets the third preset condition.

13. The flight control apparatus for an unmanned aerial vehicle according to claim 9, wherein the at least one processor is further configured to:
    obtain a maximum push-pull coefficient component in the axial directions in which the unmanned aerial vehicle can fly; and setting the velocity component of the unmanned aerial vehicle in the axial direction in which the unmanned aerial vehicle can fly to:

$$V_a^b = (1 - S_a^b \cdot pp_a^b) V_p$$

wherein $S_a^b$ is the baton coefficient component, $pp_a^b$ is a maximum push-pull coefficient component in the axial direction in which the unmanned aerial vehicle can fly, and $V_p$ is a preset velocity.

14. The flight control apparatus for an unmanned aerial vehicle according to claim 9, wherein the at least one processor is further configured to:
    obtain depth maps acquired by depth sensors arranged around a vehicle body of the unmanned aerial vehicle; and
    recognize obstacles within the preset range around the unmanned aerial vehicle, and the obstacle position and the obstacle orientation of each obstacle according to the depth maps.

15. An unmanned aerial vehicle, comprising:
    an adjustment module configured to adjust a flight direction of the unmanned aerial vehicle while the unmanned aerial vehicle is flying;
    at least one processor; and
    a memory communicatively connected to the at least one processor, wherein the memory stores instructions executable by the at least one processor, and the instructions are executed by the at least one processor to enable the at least one processor to:
      obtain an obstacle position and an obstacle orientation of each obstacle within a preset range around the unmanned aerial vehicle;
      calculate a push-pull coefficient of each obstacle relative to the unmanned aerial vehicle according to the obstacle position of each obstacle;
      obtain a target position and a target orientation of the unmanned aerial vehicle;
      calculate a baton coefficient of the target position relative to the unmanned aerial vehicle according to the target position; and
      adjust the flight direction of the unmanned aerial vehicle by adjusting the adjustment module according to the baton coefficient, the target orientation, the push-pull coefficient of each obstacle relative to the unmanned aerial vehicle, and the obstacle orientation;
    wherein the at least one processor is further configured to:
      calculate push-pull coefficient components of the push-pull coefficient of each obstacle in six axes with reference to the obstacle orientation of each obstacle;
      calculate baton coefficient components of the baton coefficient in the six axes with reference to the target orientation;
      determine, according to the push-pull coefficient components of each obstacle and the baton coefficient components, an axial direction in which the unmanned aerial vehicle can fly in the six axes;
      adjust a velocity component of the unmanned aerial vehicle in the axial direction in which the unmanned aerial vehicle can fly, to adjust the flight direction of the unmanned aerial vehicle; and
      flying the unmanned aerial vehicle based on the adjusted flight direction.

16. The unmanned aerial vehicle according to claim 15, wherein the at least one processor is further configured to:
    determine whether a baton coefficient component in each axial direction meets a first preset condition, or determine whether a push-pull coefficient component of each obstacle in each axial direction meets a second preset condition;
    determine, when the baton coefficient component in the axial direction meets the first preset condition, that the axial direction corresponding to the baton coefficient component that meets the first preset condition as an axial direction in which the unmanned aerial vehicle cannot fly; and
    determine, when the push-pull coefficient component of the obstacle in the axial direction meets the second preset condition, that the axial direction corresponding to the push-pull coefficient component that meets the second preset condition as an axial direction in which the unmanned aerial vehicle cannot fly.

17. The unmanned aerial vehicle according to claim 16, wherein the at least one processor is further configured to:
    determine, according to the push-pull coefficient components of each obstacle and the baton coefficient components, whether there is an obstacle in each of the remaining axial directions that blocks the unmanned aerial vehicle from flying in the axial directions;
    determine, when there is a blocking obstacle in the axial direction, that the axial direction is an axial direction in which the unmanned aerial vehicle cannot fly; and
    determine, when there is no blocking obstacle in the axial direction, that the axial direction is an axial direction in which the unmanned aerial vehicle can fly.

* * * * *